June 4, 1957 J. L. ARENDS 2,794,910

AUTOMATIC FREQUENCY STABILIZING CIRCUIT

Filed July 31, 1953 2 Sheets-Sheet 1

INVENTOR
JACOBUS LUDOVICUS ARENDS
BY Fred M Vogel
AGENT

INVENTOR
JACOBUS LUDOVICUS ARENDS
BY [signature]
AGENT

United States Patent Office 2,794,910 Patented June 4, 1957

2,794,910

AUTOMATIC FREQUENCY STABILIZING CIRCUIT

Jacobus Ludovicus Arends, Hilversum, Netherlands, assignor, by mesne assignments, to North American Philips Company, Inc., New York, N. Y., a corporation of Delaware Application July 31, 1953, Serial No. 371,516

Claims priority, application Netherlands August 19, 1952

5 Claims. (Cl. 250—20)

Figure 1:
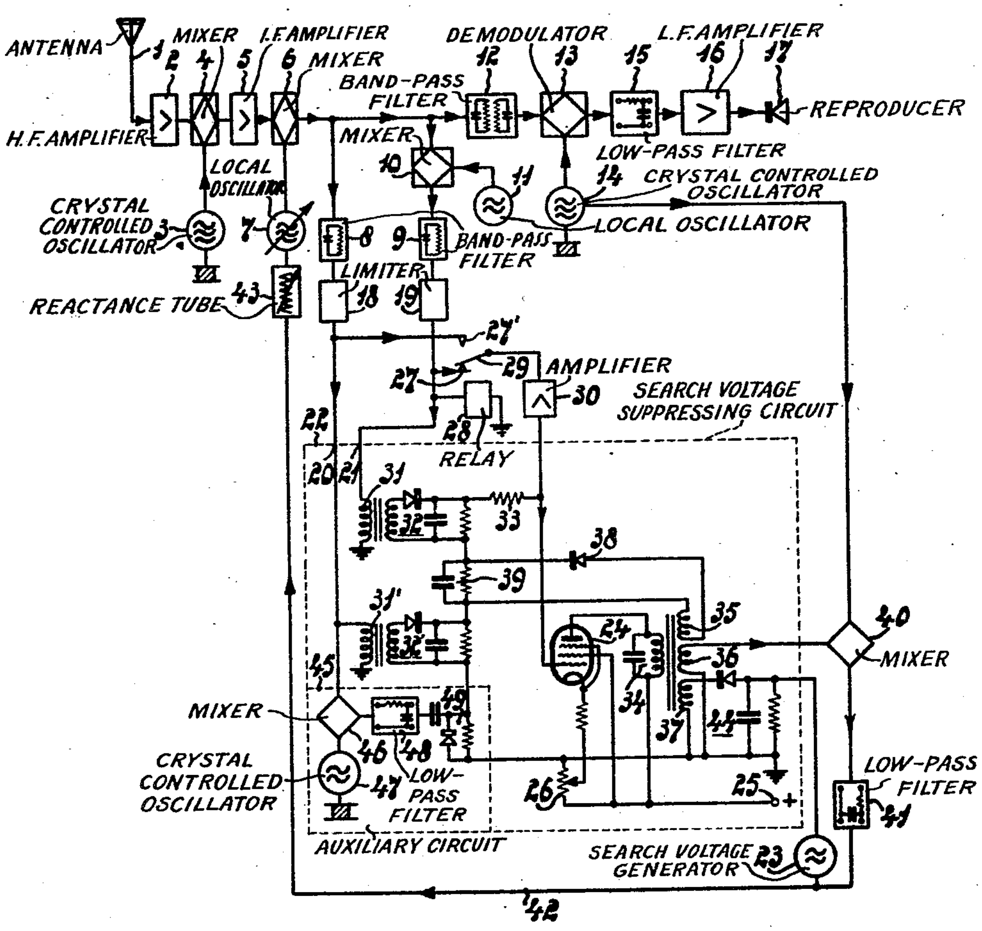

The present invention relates to an automatic frequency stabilizing circuit.

In United States Patent No. 2,698,904, issued January 4, 1955 to E. H. Hugenholtz, is described a frequency-stabilizing circuit-arrangement for automatic frequency correction (A. F. C.) of a local oscillator relative to a pilot frequency. This arrangement comprises a search-voltage generator operating in non-stabilized condition, the search voltage being suppressed when the stabilization is reached. This A. F. C. circuit comprises two pilot-frequency selectors for selecting pilot frequencies having a definite frequency difference, the output voltages of these selectors controlling together a circuit for suppressing the search voltage at the simultaneous occurrence of two pilot frequencies exhibiting the definite frequency difference.

Such A. F. C. circuits may be used, for example, for such an automatic frequency and/or phase-stabilization of a local oscillator of a superheterodyne receiver, such as, for example, a single-sideband receiver, that the desired intermediate frequency is obtained.

An important advantage of the arrangement described above is the great selectivity, since the A. F. C. circuit does not become operative until two pilot signals occur simultaneously within the ranges of passage of the pilot-frequency selectors. The possibility of stabilization on interference signals, the frequency difference of which differs slightly from the frequency difference between the pilot frequencies, depends mainly on the bandwidth of the pilot-frequency selectors.

A great selectivity of the pilot-frequency selectors, obtained for example by providing a bandwidth of a few tens of cycles per second, provides, it is true, a reduced sensitivity to interference signals. Applicant has found, however, that it creates practical difficulties, among which are:

1. The pilot-frequency selectors are included in the loop of the A. F. C. circuit and a great selectivity of these frequency selectors gives rise to instability of this loop circuit.

2. The search velocity has to be reduced with a view to the longer building-up time of the pilot-frequency selectors.

3. In selective pilot-frequency selectors the temperature exerts a comparatively great influence on the filter characteristics.

The present invention is based on the recognition of the aforesaid difficulties and has for its object to provide other means of reducing the possibility of stabilization on interference signals in a frequency-stabilizing circuit of the type described and to overcome said difficulties.

According to the present invention, the circuit for suppressing the search voltage is for this purpose provided with a blocking device, connected to an auxiliary circuit comprising a mixing stage, the input circuits of which are connected to an output of one of the pilot-frequency selectors and to the output of a preferably crystal-controlled auxiliary oscillator respectively, the frequency of which corresponds to the tuning frequency of the last-mentioned frequency selector. The auxiliary circuit comprises, moreover, a low-pass filter, connected between the output of the mixing stage and the blocking-device and passing through beat voltages produced in the mixing stage.

In a preferred embodiment of the circuit of the present invention, the cut-off frequency of the low-pass filter connected between the output of the mixing stage and the blocking device is lower than 20 cycles per second.

Figure 2:
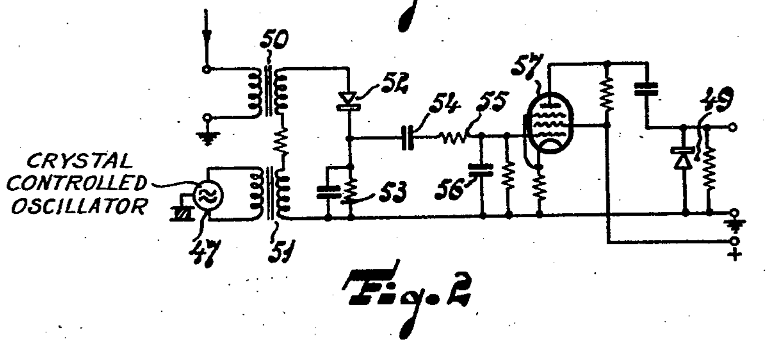

In order that the invention may be readily carried into effect, it will now be described with reference to the accompanying drawing, wherein:

Fig. 1 is a schematic diagram of a single-sideband receiver comprising a preferred embodiment of the frequency-stabilizing circuit-arrangement of the present invention;

Fig. 2 is a schematic diagram, in detail, of an embodiment of the auxiliary circuit 45 of the circuit arrangement of Fig. 1; and Figs. 3*a* to 3*d* are graphical presentations of voltage diagrams to aid in explaining the operation of the A. F. C. circuit arrangement of Fig. 1.

A single-sideband signal, received through an antenna 1, the carrier wave being suppressed, the signal being assumed to contain not only the intelligence signals but also two pilot frequencies above and below the signal band respectively, is supplied, subsequent to amplification in a high-frequency stage 2, together with the signal from a crystal-controlled oscillator 3, to a mixing stage 4. The intermediate-frequency signal, the frequencies of which extend, for example, from 1000 to 996 kilocycles per second, these frequencies representing a 60 kilocycle per second and a 64 kilocycle per second pilot frequency respectively, is mixed, subsequent to intermediate-frequency amplification in stage 5, in a second mixing stage 6, with an oscillation of 1060 kilocycles per second, produced by an automatically frequency-corrected local oscillator 7.

The single-sideband signal, occurring across the output circuit of the mixing stage 6 and extending, subsequent to the double transposition, through a frequency range of 60 to 64 kilocycles per second, is supplied, for selecting the pilot frequencies of 60 and 64 kilocycles per second, to a first pilot-frequency selector 8, constituted by a band-pass filter tuned to 60 kilocycles per second, and to a second pilot-frequency selector 9, 10, 11. The second pilot-frequency selector is constituted by a mixing stage 10, connected to the input circuit of a filter 9, also tuned to 60 kilocycles per second, and a local oscillator 11, tuned to 4 kilocycles per second. The intermediate-frequency signal taken from the mixing stage 6 is supplied, through a band-pass filter 12, passing only frequencies of 60.3 to 63.5 kilocycles per second, to a demodulator 13. To the demodulator 13 is supplied a local-oscillator signal from a crystal-controlled standard oscillator 14, tuned to 60 kilocycles per second. The low-frequency signals (0.3 to 3.5 kilocycles per second) occurring across the output circuit of the demodulator 13, are supplied through a low-pass filter 15 and a low-frequency amplifier 16 to a reproducing device 17.

The pilot frequencies derived from the pilot-frequency selectors 8 and 9—11 are supplied through limiters 18 and 19, respectively, and conductors 20 and 21, respectively, to a search-voltage suppressing circuit 22 to control a search-voltage generator 23.

The search-voltage suppressing circuit 22 comprises a blocking device, constituted by a pentode 24, serving as an amplifier, and being normally cut off by means of a positive cathode bias voltage from a potentiometer 26, connected between the positive terminal of an anode-voltage source and ground. In the device described, the pilot frequencies derived from the limiters 18 and 19, these frequencies now having a value of 60 kilocycles per second, are supplied through contacts 27 and 27′ of a relay 28, comprising a changeover contact 29, and through an amplifier 30, to the control-grid of the pentode 24. The relay 28 is energized by the oscillations occurring at the output of the limiter 19 and the changeover contact 29 then is in the position shown. In the non-energized condition of the relay 28, the changeover contact 29 is changed over to contact 27′ and the input circuit of the amplifier 30 is connected to the limiter 18. In practice an electronic relay may be substituted with advantage for the relay 28, comprising the changeover contact 29.

The output voltages of the limiters 18 and 19 are, moreover, supplied, through transformers 31 and 31′, to rectifying circuits 32 and 32′, the output circuits of which are connected in series and connected through a series resistor 33 to the control-grid of the pentode 24. In the present case, the total output voltages of the rectifiers 32 and 32′ are supplied with positive polarity to the control-grid of the pentode 24.

The anode circuit of the amplifying tube 24 comprises a resonant circuit 34, tuned to the pilot frequency of 60 kilocycles per second, and connected inductively to three coupling coils 35, 36 and 37. The coupling coil 35 is connected to a rectifying circuit, included in the control-grid circuit of the amplifying tube 24, and comprising a rectifying cell 38 and an output impedance 39, which is connected in series with the output impedances of the rectifiers 32 and 32′.

The oscillations occurring across the coupling coil 36 are supplied to a comparison device 40, comprising a mixing stage, where they are compared in frequency (and, if desired in phase) with the oscillations from the standard oscillator 14, tuned to 60 kilocycles per second. The mixing stage 40 supplies a control-voltage, which, in the case of stabilization, is mainly constituted by a direct voltage, and otherwise by an alternating voltage, corresponding to the frequency difference between the compared oscillations. This control-voltage is supplied through a low-pass filter 41 and a conductor 42 to a reactance tube 43, connected to the oscillator 7, to be stabilized in frequency.

The third coupling coil 37 is connected through a rectifying circuit 44 to the search-voltage oscillator 23, which may comprise for example, a transitron generator, the output voltage of which is supplied to the control-voltage conductor 42 connected between the variable reactance 43 and the low-pass filter 41. In the rectifying circuit 44 the oscillations supplied to the coupling coil 37 are rectified, so that a direct voltage of negative polarity is produced, which renders the search-voltage generator 23 inoperative.

In order to reduce as much as possible the possibility of stabilization on interference oscillations, the blocking-off device comprising the pentode 24 is connected, in accordance with the invention, to an auxiliary circuit 45, comprising a mixing stage 46, having input circuits connected to the pilot-frequency selector 8 and the output of a crystal-controlled auxiliary oscillator 47 respectively, the frequency of which corresponds to the tuning frequency of 60 kilocycles per second of the pilot-frequency selector 8. The auxiliary circuit 45 further comprises a low-pass filter 48, connected between the output of the mixing stage 46 and the blocking-off or cutting-off device 24 and passing beat frequencies produced in the said mixing stage. In the arrangement shown, the beat oscillations produced at the output of the low-pass filter 48 are supplied to a rectifier 49, the output circuit of which is connected in series with the output circuits of the rectifying circuits 32′, 38, 39 and 32.

In the condition in which the pilot frequencies are supplied with adequate amplitude to the rectifying circuits 32 and 32′ included in the control-grid circuit of the pentode 24, the output circuits of these rectifying circuits have produced across them direct voltages which are supplied with positive polarity to the control-grid of the pentode 24, which is initially cut off. The total output voltages of the rectifiers 32 and 32′ are, however, not sufficiently high to release the tube 24. The pentode 24 is not released until the beat frequencies produced in the mixing stage 46 have passed the range of passage of the low-pass filter 48 and produce a rectified voltage across the rectifying circuit 49.

Figs. 3*a* to 3*d* are graphical presentations of voltage diagrams to aid in explaining the operation of the circuit arrangement shown. These voltage diagrams show the direct output voltages E of the rectifying circuits 32, 32′ and 49 as a function of the frequencies of the pilot oscillations derived from the limiters 18 and 19, the basis being the tuning frequency $F_0$ of the identical bandpass filters 8 and 9.

Figure 3:
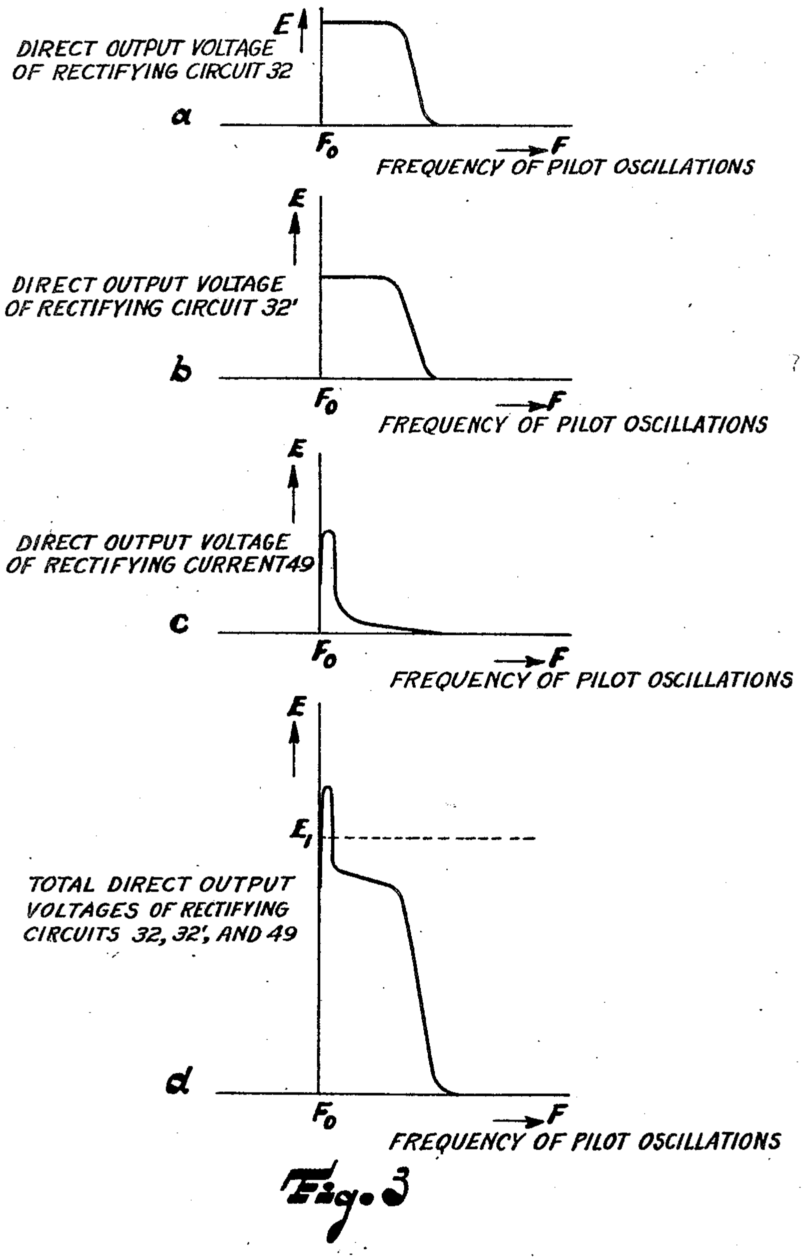

If, in the arrangement shown, the tuning frequency of the local oscillator 7 varies by means of the search-voltage generator 23, direct voltages occur across the output circuits of the rectifying circuits 32, 32′ and 49; the variations of these voltages are indicated as a function of the frequency in Figs. 3*a*, 3*b* and 3*c*, respectively.

The total output voltages of the rectifying circuits 32, 32′ and 49 are indicated in Fig. 3*d*, in which the threshold voltage of the cut-off pentode 24 is indicated by the horizontal line $E_1$. As is evident from Fig. 3*d*, the influence of the final part of the characteristic of the low-pass filter on the range of passage is substantially avoided by a suitable choice of the threshold voltage. In other words, a satisfactory selectivity is obtained.

If the total output voltages of the rectifying circuits 32, 32′ and 49 exceed the threshold voltage $E_1$, the pentode 24 is released and across the output circuit of said tube 24 occur the pilot oscillations from the amplifying stage 30, which are supplied for further variation to the coupling coils 35, 36 and 37. Thus, the effect of the pilot oscillations supplied to the coupling coil 37 is that the search-voltage generator 23 becomes inoperative, while the pilot oscillations supplied to the coupling coil 36 are compared in the comparison mixing stage 40 with the standard signal from the standard oscillator 14, in order to obtain an A. F. C. control-voltage for frequency stabilization of the local oscillator 7.

Consequently, in the circuit-arrangement shown, stabilization of the oscillator 7 does not occur until the beat frequencies produced in the mixing stage 46 have passed the range of passage of the low-pass filter 48, or in other words, the selectivity of the arrangement is determined by the limit frequency of the low-pass filter 48. From Fig. 3*d* it follows that the possibility of stabilization of the A. F. C. circuit on an interference signal is minimized, if the cut-off frequency of the low-pass filter 48 is sufficiently low. Cut-off frequencies of less than 20 cycles per second may be used with advantage in practice.

It should be noted that the auxiliary circuit 45 is completely free from the A. F. C. loop circuit, which means that a high selectivity may be obtained without adversely affecting the operation of the A. F. C. circuit. It is furthermore important that the selectivity may be obtained without using selective circuits which give rise to practical difficulties in circuit-arrangements of the type described on account of the long building-up time. It is thus particularly advantageous to use a low-pass filter, comprising a series resistor and a parallel capacitor, in the auxiliary circuit 45.

In the foregoing considerations it has been assumed that the two pilot frequencies occur at the output of the limiters 18 and 19. In order to provide that the A. F. C. circuit is stabilized on one of the pilot frequencies, if the other pilot frequency disappears due to fading, the output circuit 34 of the pentode 24 is connected to the control-grid of said pentode 24 through the circuit described above, comprising the coupling coil 35, the rectifier 38 and the network 39.

If, for example, the pilot oscillations derived from the limiter 18 fall out due to fading, the tube 24 remains energized due to the direct voltage of positive polarity occurring across the network 39, this voltage being obtained by rectification of the pilot oscillations amplified across the output circuit 34. The local oscillator 7 is also stabilized, in this case, on the pilot oscillations derived from the limiter 19.

The tube 24 also remains energized, if the pilot frequencies derived from the limiter 19 fall out. In this case, the energizing current of the relay 28 is cut off and the changeover contact 29 is changed over to contact 27'. Then the local oscillator 7 is stabilized on the pilot frequency derived from the limiter 18.

If the two pilot frequencies fall out, no oscillations occur across the output circuit 34 of the pentode 24, the latter is cut off and the search-voltage generator 23 becomes operative. The search voltage generator 23 supplies a voltage of low frequency, for example, of 3 cycles per second, to the variable reactance 43 and the frequency of the local oscillator is automatically varied in a low-frequency rhythm until the two pilot frequencies re-occur across the outputs of the frequency selectors 18 and 19. After that the search-voltage generator 23, as stated before, becomes inoperative, since the blocking device 24 becomes operative.

Fig. 2 is an embodiment of the auxiliary circuit 45 of the circuit arrangement of Fig. 1. Corresponding elements of Figs. 1 and 2 are designated by the same reference numerals.

In Fig. 2 the oscillations derived from the limiter 18 and the crystal oscillator 47 are supplied through transformers 50 and 51 to a mixing circuit, comprising a rectifier 52 and an output circuit 53. The output oscillations of the mixing stage are supplied through a blocking capacitor 54 and a low-pass filter, comprising a series resistor 55 and a parallel capacitor 56, and passing the beat oscillations, to an amplifying tube 57, the anode circuit of which includes the rectifying circuit 49. The blocking capacitor 54 serves to prevent the direct voltage produced in the mixing process from affecting the direct-current position of the amplifying tube 57. In the circuit-arrangement of Fig. 2 the standard oscillator 14 may be substituted for the separate crystal oscillator 47, to be used as an auxiliary oscillator.

While the invention has been described by means of a specific example and in a specific embodiment, I do not wish to be limited thereto, for obvious modifications will occur to those skilled in the art without departing from the spirit and scope of the invention.

What is claimed is:

1. In a receiver having a communication channel adapted to receive a signal which includes two pilot frequency waves having a predetermined frequency difference and having a local oscillator coupled to said channel and controlled by a voltage-responsive reactance device, an automatic frequency stabilizing circuit for stabilizing the frequency of said local oscillator comprising a search voltage generator coupled to said reactance device, first and second means each coupled to said channel for selecting one of said two pilot waves, and means for suppressing the search voltage from said search voltage generator at the simultaneous occurrence of said two pilot frequency waves in said suppressing means, the output of said first and second means being coupled to said suppressing means, said search voltage suppressing means comprising a signal blocking device coupled to said search voltage generator and an auxiliary circuit comprising a mixing stage having an input circuit connected to the output of one of said selecting means, a crystal-controlled auxiliary oscillator having a frequency which corresponds to the tuning frequency of the last-mentioned selecting means, said auxiliary oscillator being connected to an input circuit of said mixing stage, and a low-pass filter connected between the output of said mixing stage and said signal blocking device.

2. An automatic frequency stabilizing circuit, as set forth in claim 1, wherein the cut-off frequency of said low-pass filter is less than 20 c./s.

3. An automatic frequency stabilizing circuit, as set forth in claim 1, wherein said low-pass filter comprises a series resistor and a parallel capacitor.

4. An automatic frequency stabilizing circuit, as set forth in claim 1, further including a rectifying circuit interposed between the output of said low-pass filter and said signal blocking device.

5. A receiver for receiving a single-sideband signal which includes two pilot frequency waves having a predetermined frequency difference comprising means for intercepting said signal, a first mixing stage, a high-frequency amplifier interposed between said intercepting means and said first mixing stage, a first crystal-controlled oscillator coupled to said mixing stage, a second mixing stage, an intermediate-frequency amplifier interposed between said first mixing stage and said second mixing stage, a first local oscillator coupled to said second mixing stage, a variable reactance device coupled to said local oscillator, a first pilot-frequency wave selecting device coupled to the output of said second mixing stage, a second pilot-frequency selecting device, a third mixing stage interposed between said second mixing stage, and said second selecting device, a second local oscillator coupled to said third mixing stage, a fourth mixing stage, a bandpass filter interposed between said second mixing stage and said fourth mixing stage, a second crystal-controlled standard oscillator coupled to said fourth mixing stage, a first low-pass filter coupled to the output of said fourth mixing stage, a reproducing device, a low-frequency amplifier interposed between said low-pass filter and said reproducing device, a relay comprising an energizing winding, two point contacts and a change-over contact, a first limiter connected between one of said point contacts and said first pilot-frequency wave selecting device, a second limiter connected between said second selecting device and the other of said point contacts, said energizing winding being connected between the output of said second limiter and ground, first rectifying means coupled to said first limiter for producing a direct voltage having a value as determined by the amplitude of the first pilot-frequency wave, second rectifying means coupled to said second limiter for producing a direct voltage having a value as determined by the amplitude of the second pilot-frequency wave, a fifth mixing stage coupled to said first limiter, a third crystal-controlled oscillator coupled to said fifth mixing stage, a second low-pass filter coupled to the output of said fifth mixing stage, third rectifying means coupled to the output of said second filter for producing a direct voltage having a value as determined by the amplitude of the difference voltage derived from the output of said fifth mixing stage, a signal blocking device having an anode, a cathode and a control grid, fourth rectifying means coupled to said anode for producing a direct voltage having a value as determined by the amplitude of the output voltage of said signal blocking device, a pilot-frequency amplifier interposed between said change-over contact and said grid, means for serially applying said direct voltages to said grid, means for applying a positive potential to said cathode, a sixth mixing stage coupled to said second crystal-controlled standard oscillator, means for applying the output voltage from said signal blocking device to said sixth mixing stage, a second lowpass filter interposed between the output of said sixth mixing stage and said variable reactance device, a search voltage generator having an output connected to said variable reactance device, and fifth rectifying means coupled to the anode of said signal blocking device for applying a negative voltage to said search voltage generator, said negative voltage having a value as determined by the amplitude of the output voltage of said signal blocking device.

References Cited in the file of this patent

UNITED STATES PATENTS

| | | |
|---|---|---|
| 2,287,925 | White | June 30, 1942 |
| 2,406,125 | Ziegler et al. | Aug. 20, 1946 |
| 2,558,100 | Rambo | June 26, 1951 |
| 2,589,387 | Hugenholtz | Mar. 18, 1952 |